United States Patent [19]

Ries

[11] 3,785,449

[45] Jan. 15, 1974

[54] SELF-CONTAINED POWER TRANSMITTING ASSEMBLY

[75] Inventor: Donald L. Ries, Dearborn Heights, Mich.

[73] Assignee: Rockwell International Corporation, Pittsburgh, Pa.

[22] Filed: Aug. 27, 1971

[21] Appl. No.: 175,628

[52] U.S. Cl................ 180/6.48, 180/9.62, 192/3 R
[51] Int. Cl............................................. B62d 55/00
[58] Field of Search.................. 180/6.48, 6.7, 9.62; 192/3 R

[56] References Cited
UNITED STATES PATENTS

| 2,994,393 | 8/1961 | Whaley | 180/6.48 |
| 3,536,230 | 10/1970 | Williams | 192/3 R |
| 2,344,730 | 3/1944 | Ramsey | 180/6.48 |
| 1,317,103 | 9/1919 | Rimailho | 180/9.62 |
| 3,074,499 | 1/1963 | Bertelsen | 180/9.62 |
| 3,368,425 | 2/1968 | Lewis | 180/6.48 X |

Primary Examiner—Kenneth H. Betts
Assistant Examiner—Leslie J. Paperner
Attorney—John R. Bronaugh et al.

[57] ABSTRACT

A self-contained power transmitting assembly capable of being mounted as a unit in a motor vehicle having a structural frame and ground engaging propulsion means such as an endless track. Said assembly includes a rigid elongated housing secured to the frame means, a motor mounted to the housing and projecting therefrom in a direction parallel to the longitudinal axis of the housing and plural gear reduction means positioned within the housing. The motor drives the gear reduction means which in turn drive output means carried by the housing and capable of being drivingly connected to the ground engaging propulsion means.

1 Claim, 5 Drawing Figures

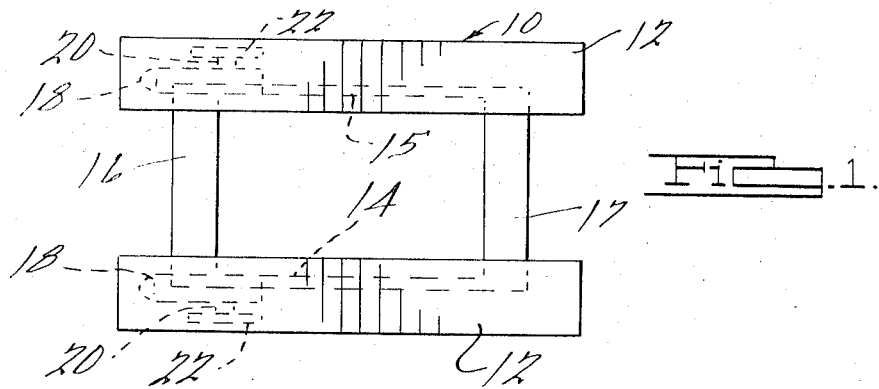
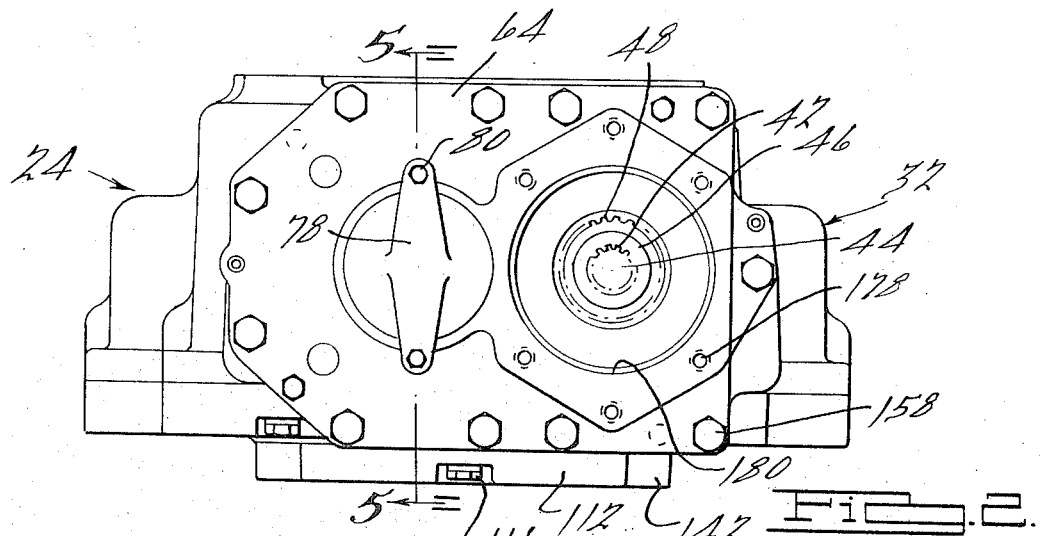
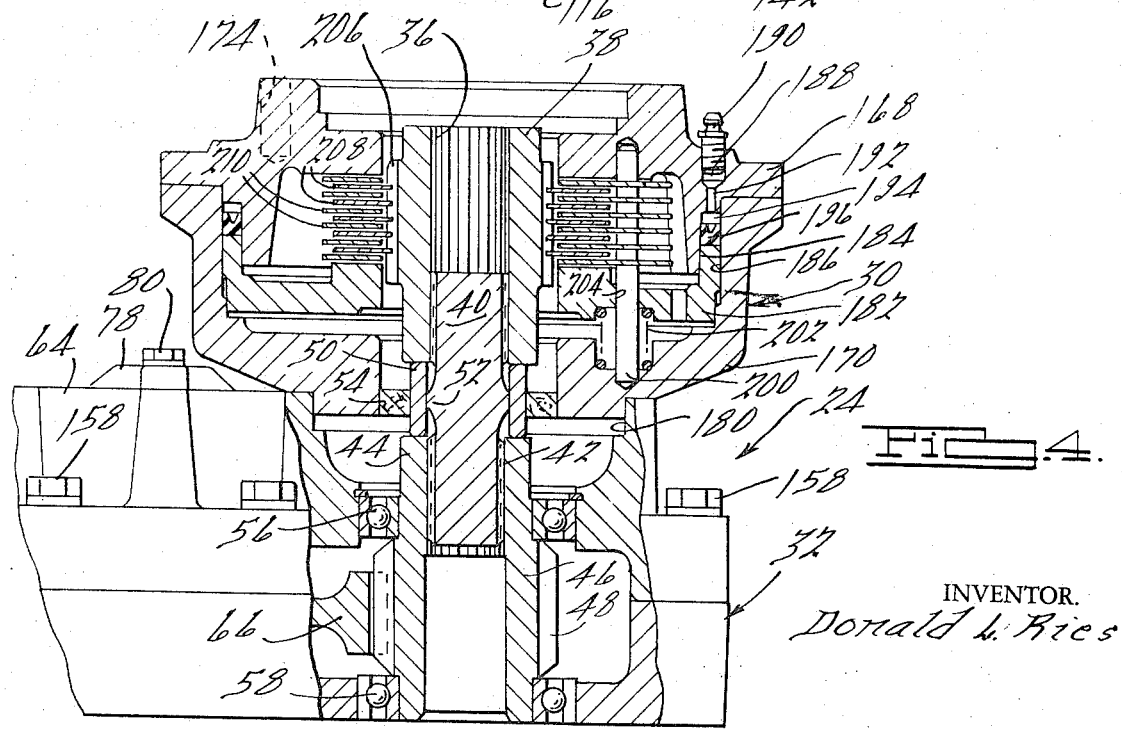

SELF-CONTAINED POWER TRANSMITTING ASSEMBLY

BACKGROUND AND OBJECTS OF THE INVENTION

This invention relates to a self-contained power transmitting assembly capable of being used to drive motor vehicles. More particularly, the invention relates to the use of such an assembly as a drive component in a vehicle having ground engaging, endless crawler tracks.

Tracked vehicles frequently are operated in difficult terrain making it necessary to shield power drive components such as the engine, hydraulic power transmitting systems, and gear boxes from possible contact and damage by terrain obstacles. It is generally known to shield such power drive components in the manner disclosed by U.S. Pat. No. 3,529,687, issued to Pensa on Sept. 22, 1970, and entitled "Drive Arrangement for Tracked Vehicles." Pensa discloses a hydraulic motor and associated motor brake rotor shielded by a front cross member of a vehicle chassis. A remotely positioned gear box engaging a sprocket shaft is partially mounted behind a rear cross member. A long drive shaft having universal joint assemblies at each end interconnects the hydraulic motor and gear box. Additional shielding is necessary to adequately protect this vulnerable long drive shaft which increases the space requirements, weight and ultimate expense of the vehicle drive train components.

It is an object of this invention to provide a novel, self-contained power transmitting assembly adapted to be mounted as a unit within the protective profile of an endless track of a motor vehicle, which assembly has an economical and compact space saving design.

It is a further object to provide an improved power transmitting assembly which is designed for ease of manufacture and assembly and that is reliable in operation and simple to maintain.

It is a further object to house all parts of the power transmitting assembly within a rigid shell, which shell easily may be removed to allow servicing and repair work.

SUMMARY OF THE INVENTION

A power transmitting assembly constructed in accordance with this invention comprises a rigid, elongated housing secured to vehicle frame means and mounting a motor projecting from the housing in a direction parallel to the longitudinal axis of the housing. Plural gear reduction means are positioned within the housing and driven by the motor. An output means is carried by the housing and driven by the plural gear reduction means. The output means is capable of being drivingly connected to ground engaging propulsion means, such as a drive sprocket of an endless track.

DESCRIPTION OF THE DRAWINGS

FIG. 1 is a schematic plan view of a tracked vehicle mounting the self-contained power transmitting assembly of this invention within the track profile;

FIG. 3 is an side elevation view with parts in section and parts broken away, of the power transmitting assembly mounted on the vehicle of FIG. 1;

FIG. 4 is an enlarged fragmentary sectional view with parts removed of a portion of the assembly shown in FIG. 3.

DESCRIPTION OF THE INVENTION

Figure 2:
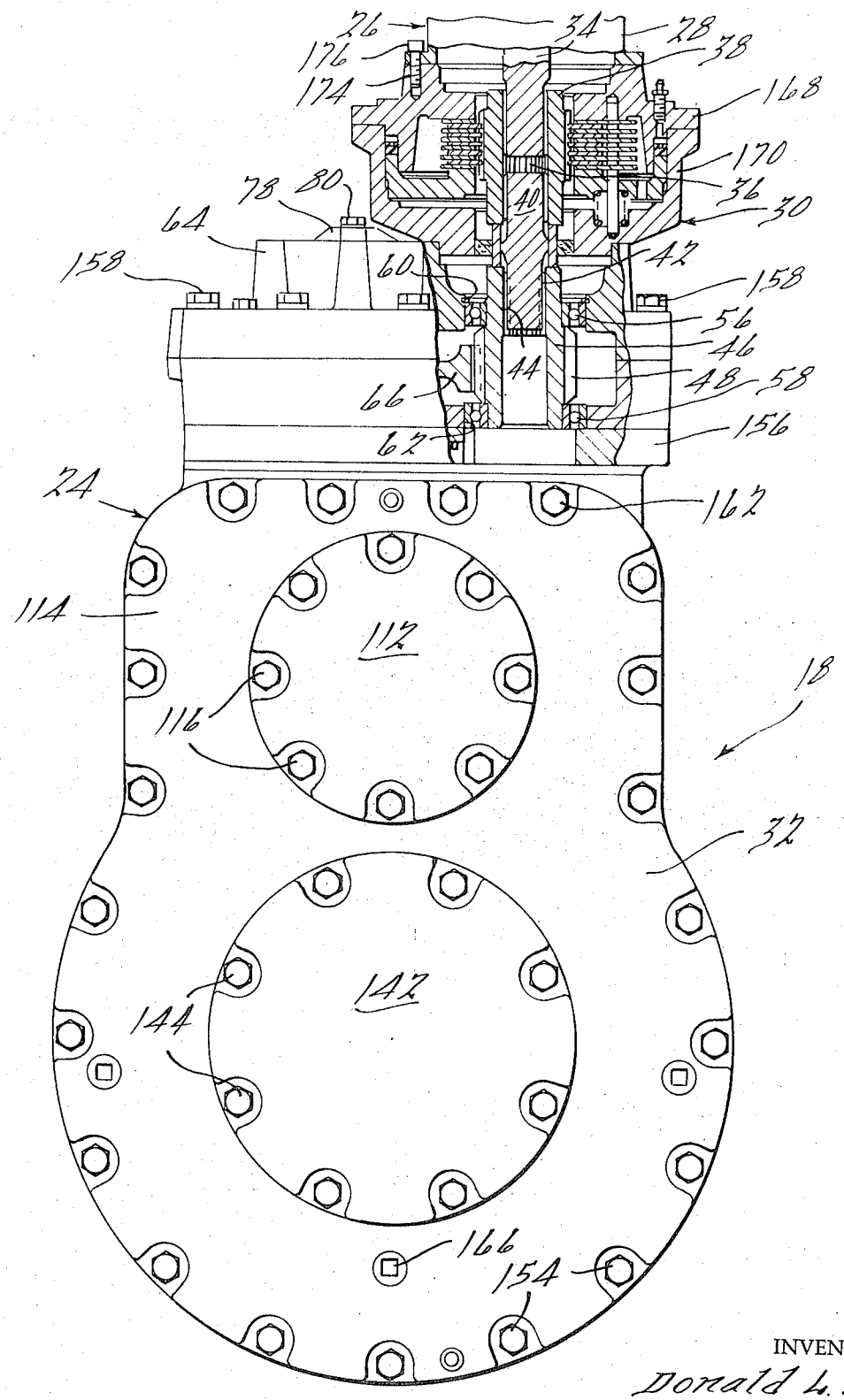
FIG. 2 is an enlarged end view with parts removed of the power transmitting assembly mounted on the vehicle of FIG. 1.

Referring to the drawings, FIG. 1 shows a motor vehicle 10 having ground engaging propulsion means in the form of endless tracks 12. Vehicle side frames 14 and 15 are joined by cross members 16 and 17 to form the vehicle chassis. Securely mounted to each side frame, as by welding or suitable fasteners, are a pair of self-contained power transmitting assemblies 18. Each assembly 18 mounts and drives a sprocket shaft 20 having a drive sprocket 22 at one of its ends. Sprockets 22 engage and drive the tracks 12.

Assemblies 18 have elongate shapes adapted to be positioned entirely within the protective profile of endless tracks 12. As shown in FIG. 1, the widths of the elongate assemblies are less than the widths of the tracks.

Referring to FIGS. 2-4, there may be seen the details of one of the assemblies 18 having an elongate, composite, rigid shell 24. One end of the shell carries a motor 26, preferably hydraulic, mounted within a motor housing 28. Motor housing 28 in turn is mounted on housing portion 30 of shell 24 which internally mounts a disc brake assembly, the operation of which is explained later. Housing portion 30 is in turn mounted on a gear box housing portion 32 of shell 24 carrying plural gear reduction means therein. Motor 26 drives the gearing and the disc brake assembly arrests motion of the gearing.

Motor 26 has a standard size output drive shaft 34 drivingly engaging an internal splined bore 36 of a coupling hub 38. Coupling hub 38 is positioned within shell housing portion 30. A connecting shaft 40 having splines thereon engages splined bore 36 for unitary rotation with hub 38. The end of shaft 40 remote from hub 38 engages an internal splined bore 42 of a hub 44 rotatably mounted within shell housing portion 32. A spur gear 46 having gear teeth 48 is integrally formed at one end of hub 44.

As best seen in FIGS. 3 and 4, a rigid spacer collar 50 is mounted on a shoulder 52 of connecting shaft 40 for rotation therewith and extends axially between the inner end of hub 38 and the outer end of hub 44 to aid in coaxially aligning the hubs. Collar 50 is surrounded by a suitable lubricant seal device 54 which extends between it and housing portion 30 and prevents lubricant from entering the area proximate the disc brake.

Gear 46 is rotatably mounted at its opposite ends in ball bearing assemblies 56 and 58 disposed in opposed openings 60 and 62 respectively of an upper hollow member 64 that is part of the gear box housing portion 32.

Figure 5:
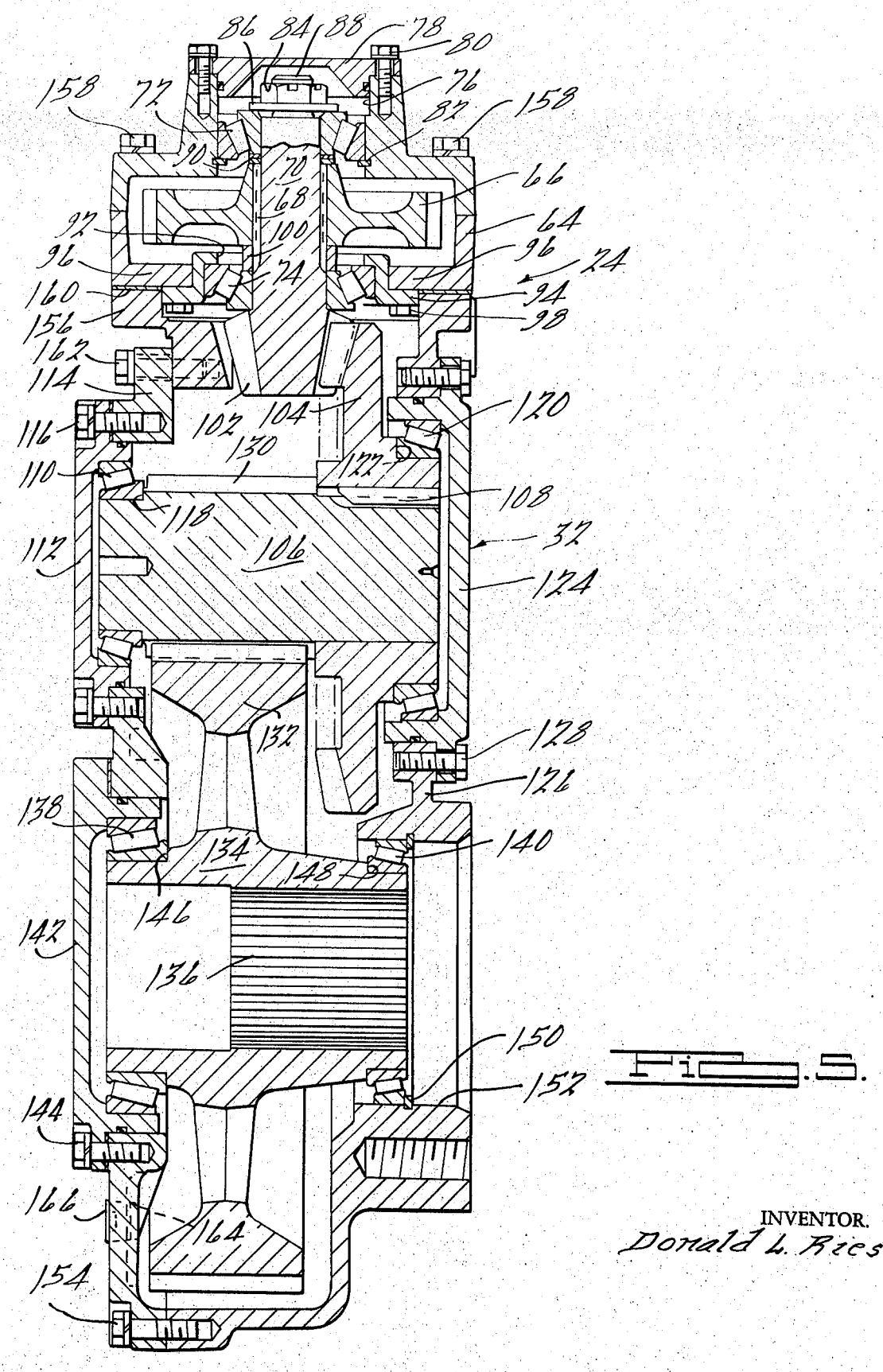
FIG. 5 is a sectional view taken along the line 5—5 of FIG. 2.

As indicated in FIGS. 3 and 5, the gear box housing portion 32 has an elongate shape within which plural gear reductions means are mounted. Spur gear 46 meshes with spur gear 66 which is splined at 68 to shaft 70.

Shaft 70 is rotatably mounted in tapered roller bearing assemblies 72 and 74. Bearing assembly 72 is disposed in opening 76 of member 64, which opening is normally closed by a cap 78 secured in place by bolts 80. The outer race of bearing assembly 72 axially abuts a stop washer 82 placed in the cylindrical wall of opening 76. A suitable nut 84 and washer 86 on a threaded end 88 of shaft 70 provide for bearing retainer and adjustment. Bearing spacers 90 are mounted on shaft 70 between the hub of gear 66 and the inner race of bearing assembly 72.

Shaft 70 passes through an aperature 92 in a roller assembly retainer bracket 94 which is mounted to an internal flange 96 of member 64 by bolts 98. The outer race of roller bearing assembly 74 is mounted to retainer bracket 94. A spacer 100 mounted for rotation with shaft 70 by splines 68 abuts the hub of gear 66 and the inner race of roller assembly 74.

Shaft 70 has a pinion 102 integrally formed at its one end, which pinion drivingly engages a crown gear 104. In the preferred form, gears 102 and 104 are hypoid gears. Gear 104 is mounted to one end of a shaft 106 for rotation therewith by means of a key 108. Shaft 106 is rotatably mounted at one end in tapered roller bearing assembly 110. Bearing assembly 110 has its outer race mounted on the inside of a circular cover plate 112 detachably bolted to a gear box housing side plate 114 by bolts 116. The inner race of bearing assembly 110 axially abuts a shoulder 118 on one end of shaft 106. The other end of shaft 106 is rotatably mounted in a tapered roller bearing assembly 120 which has its inner race abutting a shoulder 122 on the outer end of the hub of crown gear 104. The outer race of bearing assembly 120 is mounted on the inside of a circular cover plate 124 detachably bolted to a gear box housing side plate 126 by bolts 128.

Shaft 106 has spur gear teeth 130 integrally formed around one end thereof. Teeth 130 drivingly engage spur gear 132 which is integrally formed about a hollow hub 134. Hollow hub 134 has an internally splined bore 136 which is adapted to drivingly engage an output means, such as one end of one of the previously referred to sprocket shafts 20.

Hub 134 is rotatably mounted in tapered roller bearing assemblies 138 and 140. Bearing assembly 138 has its outer race mounted on the inside of a circular cover plate 142 detachably bolted to side plate 114 by bolts 144. The inner race of bearing assembly 138 axially abuts a shoulder 146 on one end of hub 134. Tapered roller bearing assembly 140 has its inner race abutting a shoulder 148 formed on the other end of hub 134. The outer race of bearing assembly 140 abuts a stop washer 150 fixed in a groove in the cylindrical wall of an output aperture 152 extending through side plate 126.

Referring to FIGS. 2, 3 and 5, it may be seen that housing portion 32 of rigid shell 24 is fabricated from several elements detachably fastened to each other to allow ease of manufacture and assembly. Side plates 114 and 126 are fastened together by a row of bolts 154. Sideplate 126 has a right angle extension 156 which serves to mount housing member 64. Bolts 158 fasten internal flange 96 to extension 156. A sealing gasket 160 interfits between flange 96 and extension 156. Sideplate 114 is bolted to extension 156 by a row of bolts 162. Additionally, side plate 114 has several oil plug holes 164 extending through the lower portion thereof. Threaded plugs 166 close these holes.

The general operation of the disc brake device which is more fully disclosed in U.S. Pat. No. 3,536,230, entitled "Reduction Gearing Drive Control," patented by Williams on Oct. 27, 1970, and assigned to the assignee of this invention will now be explained.

As best seen in FIGS. 3 and 4, housing portion 30 comprises an outer housing member 168 and an inner housing member 170 secured together by suitable fasteners such as bolts (not shown). The top of housing member 168 has a row of threaded holes 174 adapted to receive a row of bolts 176 used to detachably fasten motor housing 28 to housing member 168. Inner housing member 170 is detachably secured to member 64 of gear box housing portion 32 by means of bolts (not shown) received in threaded holes 178 (FIG. 2) formed in the top of member 64. Member 64 has an annular recess 180 which serves to seat one end of inner housing member 170.

Within the housing portion 30, an annular plunger 182 is slidably mounted between cylindrical inner surfaces 184 and 186 of the housing members 168 and 170 for reciprocation parallel to the axis of hub 38. A port 188 in housing member 168 receives an oil pressure line fitting 190. Port 188 communicates by means of passage 192 with an annular chamber 194 in which is located a resilient seal ring 196 mounted to one end of plunger 182 for movement therewith.

A plurality of fixed parallel pins 200 (one shown) have their opposite ends fixed in the housing members 168 and 170, and each is surrounded by a coiled compression spring 202 extending between housing member 168 and piston 182 to bias piston 182 upwardly as viewed in FIG. 4. Plunger 182 is apertured at 204 for slidable clearance with pins 200.

Hub 38 is longitudinally splined at 206 to mount the inner serrated peripheries of a series of parallel inner brake discs 208. A series of parallel outer brake discs 210 are longitudinally slidably supported on pins 200. Discs 208 extend through the spaces between discs 210. When fluid pressure is introduced into chamber 194, as when motor 26 is being driven, plunger 182 is displaced downwardly in FIG. 4 so that the brake discs are not fricionally engaged and hub 38 is free to rotate. Springs 202 are compressed in this position of the plunger.

When hydraulic pressure is reduced in chamber 194, the energized springs 202 expand to displace plunger 182 upwardly and urge the brake discs into frictional engagement for arresting rotation of hub 38 and the associated reduction gearing previously described. Further details of the operation of the brake device may be found in the previously mentioned U.S. Pat. No. 3,526,230.

In summary, it may be stated that the novel self-contained power transmitting assembly 18 comprises three major components, the motor, brake device, and gearing. A rigid shell 24 comprising the previously described housing sub-assemblies forms an elongated compact covering which protectively encloses all moving parts. The motor is carried by the shell 24 and projects therefrom in a direction parallel to the longitudinal axis of the shell. This arrangement allows the complete power transmitting assembly 18 to be mounted within the profile of an endless track 12 for protection from damage. Individual housing sub-assemblies are detachably mounted to each other to facilitate ease of manufacture, assembly and maintenance.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. A self-contained power transmitting assembly capable of being mounted as a unit in a motor vehicle having structural frame means and ground engaging track propulsion means, said assembly including:

a rigid elongate housing secured to said frame means and having a longitudinal axis parallel to the longitudinal axis of said vehicle, a motor mounted to said housing and projecting therefrom in a direction parallel to said axes, shaft means within said housing and capable of interconnection with said motor, three separate gear reduction means comprising: first gear means operatively connected to said shaft means for unitary reduction therewith about an axis of rotation parallel to said longitudinal axes in response to driving power applied to said shaft from said motor, second gear means engaging and driven by said first gear means, third gear means comprising a pinion gear operatively connected to said second gear means for unitary rotation therewith about an axis of rotation parallel to but laterally spaced from the axis of rotation of said first gear means, fourth gear means comprising a ring gear engaging and driven by said third gear means, fifth gear means operatively connected to said fourth gear means for unitary rotation therewith about an axis of rotation perpendicular to the axes of rotation of said first, second and third gear means, sixth gear means engaging and driven by said fifth gear means, motor output means operatively secured to said sixth gear means for unitary rotation therewith about an axis of rotation of said fourth and fifth gear means, said output means capable of being drivingly connected to said propulsion means, and brake means mounted within said housing and operative to arrest movement of said gear reduction means, said brake means being positioned in a train of power immediately downstream of said motor and upstream of said gear reduction means and operatively acting to arrest rotation of said shaft.

* * * * *